| United States Patent [19] | [11] 4,079,763 |
| Riley | [45] Mar. 21, 1978 |

[54] CONVERTIBLE HACKSAW

[76] Inventor: Lester C. Riley, Rte. 1, Box 35-C, Westville, Fla. 32464

[21] Appl. No.: 738,830

[22] Filed: Nov. 4, 1976

[51] Int. Cl.² ............................................. B27B 21/02
[52] U.S. Cl. ................................ 145/33 R; 145/34 R; 145/108 B
[58] Field of Search ............... 145/108 B, 109, 108 R, 145/108 A, 33 R, 33 A, 33 C, 33 E, 34 R, 34 A

[56] References Cited

U.S. PATENT DOCUMENTS

| 443,553 | 12/1890 | Taylor | 145/108 B |
| 518,656 | 4/1894 | Van Campen | 145/108 R |
| 933,867 | 9/1909 | Wicke et al. | 145/109 |
| 1,277,131 | 8/1918 | Ruth | 145/108 B |
| 1,812,928 | 7/1931 | Bundy | 145/108 B |
| 1,865,026 | 6/1932 | Loga | 145/34 R |
| 2,102,782 | 12/1937 | Blum | 145/33 R |
| 3,822,731 | 7/1974 | Keymer | 145/108 R |
| 3,840,059 | 10/1974 | Ingro | 145/108 B |

FOREIGN PATENT DOCUMENTS

| 1,325,867 | 3/1963 | France | 145/108 B |
| 835,242 | 3/1952 | Germany | 145/108 B |
| 1,377 | 3/1888 | Sweden | 145/33 R |
| 129,119 | 8/1950 | Sweden | 145/108 B |
| 793,110 | 4/1958 | United Kingdom | 145/108 B |

Primary Examiner—James L. Jones, Jr.
Assistant Examiner—J. T. Zatarga
Attorney, Agent, or Firm—Duckworth, Hobby, Allen & Pettis

[57] ABSTRACT

A hacksaw includes a frame having a cross member and two struts, with a saw blade detachably connected between the extremities of the struts. A handle is carried by one of the struts and cooperates with a locking button and shaft arrangement to allow the handle to be rotated about the strut and locked in selected positions. A sleeve arrangement at the extremity of each strut allows the plane of the blade to be changed with respect to the plane of the struts.

5 Claims, 4 Drawing Figures

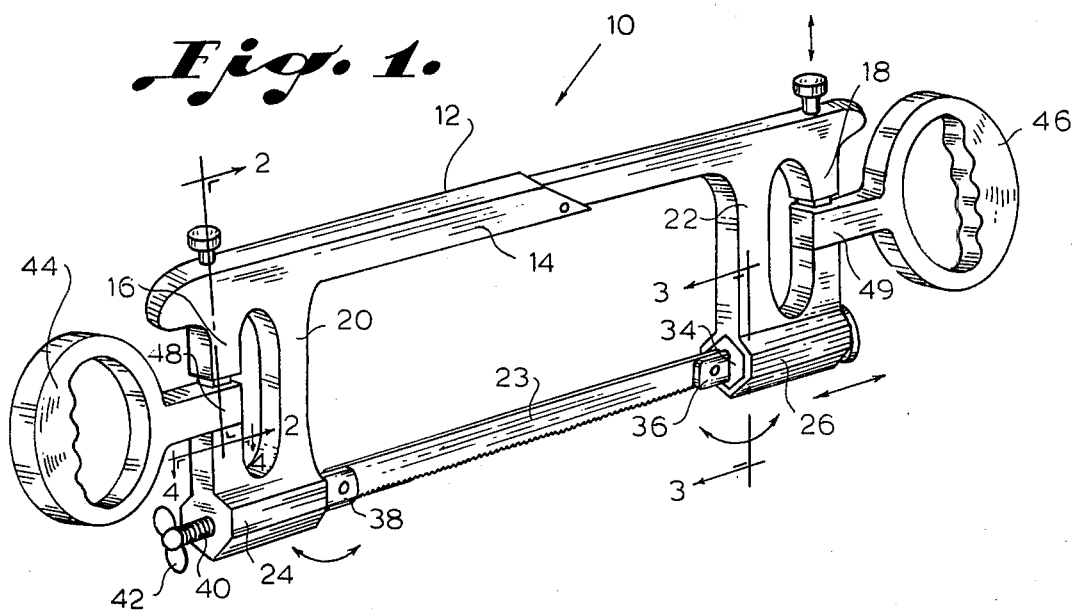
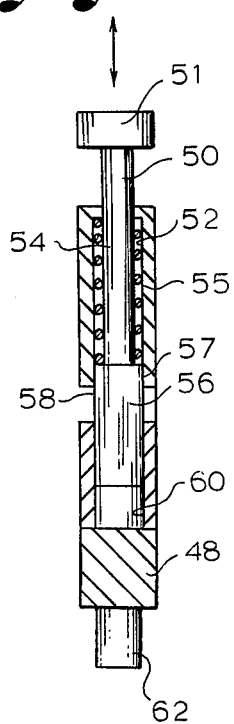
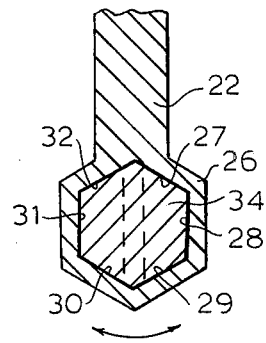
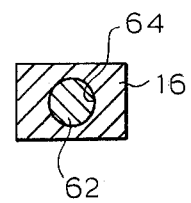

4,079,763

CONVERTIBLE HACKSAW

BACKGROUND OF THE INVENTION

1. Field of the Invention

The present invention relates to an improvement in hacksaws, and more specifically relates to hacksaws of the type in which the handle may be rotated to selected positions and in which the plane of the blade may be changed with respect to the plane of the tool.

2. Description of the Prior Art

There have been suggestions in the prior art to provide means on hacksaws and similar tools to allow the handle to be rotated out of the plane of the tool, such that the tool may be used in closely confined jobs. In U.S. Pat. No. 2,137,742, Jack discloses a hacksaw arrangement employing a handle in which the handle may be rotated out of the plane of the tool. Similar arrangements are disclosed in U.S. Pat. Nos. 1,731,093 to Bouquet and 1,812,928 to Bundy.

In U.S. Pat. No. 3,840,050, Ingro discloses a hacksaw employing a conventional hacksaw frame, in which the extremities of the frame are adapted to allow the plane of the blade to be changed with respect to the plane of the tool. This is accomplished by utilizing a sleeve member at the extremity of the tool having a hole extending therethrough which is defined by peripheral flattened sides. The blade is held in place by holding members having flat sides corresponding to that of the hole in the sleeve, so that rotation of each blade holding member allows the plane of the blade to be changed.

SUMMARY OF THE INVENTION

The present invention contemplates a novel hacksaw comprising a frame having a cross member and two struts extending substantially normal to the cross member. A saw blade is provided, with means for detachably connecting the blade between the extremity of the two struts. A handle is carried by one of the struts and extends substantially normal thereto, the hacksaw further including means for rotating the handle about the strut. Means are also provided for locking the handle in selected positions about the strut, and a locking button extending through the cross member is included so as to cooperate with the locking means whereby the locking means may be removed so as to allow rotation of the handle to a selected position.

In accordance with another aspect of the present invention, the hacksaw may be also provided with a similar handle arrangement at the other end of the tool, such that when the hacksaw is being used on a job requiring that the handles be rotated out of the plane of the tool, the tool can be operated by both hands so as to allow the tool to be adequately steadied.

A further aspect of the hacksaw in accordance with the present invention is the utilization of apparatus which allows the plane of the blade to be changed in cooperation with the above described means for changing the position of the handle out of the plane of the tool.

DESCRIPTION OF THE DRAWINGS

FIG. 1 is a perspective view of a hacksaw in accordance with the present invention.

FIG. 2 is a cross-section of a portion of the hacksaw shown in FIG. 1, taken along the lines 2—2.

FIG. 3 is a cross-section of a portion of the hacksaw shown in FIG. 1, taken along the lines 3—3.

FIG. 4 is a third cross-section of the hacksaw shown in FIG. 1, taken along the lines 4—4.

DETAILED DESCRIPTION

A hacksaw in accordance with the present invention will now be described with reference to the drawings.

First noting FIG. 1, the hacksaw, referred to generally as 10, includes a frame 12 defined by a cross-member 14 and first and second struts 16 and 18 at opposing ends of the cross-member. Third and fourth additional support struts 20 and 22 may also be provided, but are not essential.

Means are also provided at the extremities of each combination of struts 16, 20 and 18, 22 to detachably connect a saw blade 23 between those extremities. Further in accordance with this invention, this detachable connecting means for the saw blade 23 is provided with means for changing the plane of blade with respect to the plane of the struts 16, 18, 20 and 22.

Referring now to FIGS. 1 and 3, these features are provided by the use of a pair of sleeves 24 and 26 which are integrally fabricated with the corresponding pair of struts 16, 20 and 18, 22, respectively. With specific reference to FIG. 3, each sleeve 24, 26 has a hole therethrough axial with the saw blade 23, the periphery of the hole begin defined by six flat sides 27, 28, 29, 30, 21 and 32, this hole adapted to receive a blade holding member 34 having a periphery and dimensioned so as to extend through and engage the flat sides of the sleeve 26. While a hexagonal shape has been described in this example, it will be understood by those skilled in the art that any flat-surfaced design having three or more surfaces will suffice for purposes of changing the plane of the blade 23 with respect to the plane of the struts 16, 18, 20 and 22. A flat 36, 38 extends from each of the blade holding members 34, and is engagable with an extremity of the saw blade 23. (note FIG. 1).

In order to hold the saw blade 23 rigidly between the extremities of the pairs of struts 16, 20 and 18, 22, the blade holder member 34 associated with the sleeve 24 is provided with a threaded shaft 40 extending through the back side of the sleeve, and is engagable with a wing nut 42 in a conventional manner so as to pull the blade holding member through the corresponding hole in the sleeve 24 to hold both of blade holding members fast. This portion of the arrangement is well known to those skilled in the art, and therefore will not be described in greater detail.

Reference is now made to FIGS. 1, 2 and 4. The hacksaw 10 is provided with two handles 44 and 46 each at opposite extremities of the tool. In accordance with this invention, the hacksaw 10 is provided with means for allowing the handles 44, 46 to be rotated to selected positions which are normal to the plane of the tool, and locked in that position.

Noting FIGS. 1 and 2, the hacksaw 10 is provided with two rotatable blocks 48 and 49 which form a part of the corresponding strut 16 and 18, respectively.

The cross-member 14 has a hole 52 therein at each extremity and axial with the corresponding strut 16, 18. A shaft 50 extends through the hole 52, the hole being defined by four flat sides in a conventional manner. One end of the shaft is defined by four flat sides, including flat sides 56, 57, and 58, which are adapted to engage the flat sides of the hold 52. The shaft 50 includes a reduced diameter portion 54 between the locking button 51 and the one hand defined by the flat sides 56–58, with a spring 55 about the reduced diameter portion 54.

The block 48 includes a hole 60 therein, which is likewise defined by four flat surfaces so as to engage the flat surfaces 56–58 of the shaft 50 in a conventional manner. (Note FIG. 2). The block 48 likewise includes a dowel 62 which extends through a hole 64 in that part of the strut 16 underneath the block 48 (Note FIG. 4).

In use, the locking button is pulled upward, causing the one end of the shaft 50 defined by the flat surfaces 56–58 to extend out of the hole 60 and the block 48. The handle 44 is then rotated to a selected position, for example 90° with respect to the plane of the tool 10, and the locking button is released allowing the spring to force the one end of the shaft 50 into the hole 60 of the block 48. While a 90° rotation of the handle 44 is obtained when the one end of the shaft and the corresponding holes are dimensioned as shown in FIG. 2, it will be understood by those skilled in the art that any shape may be used employing three of more flat surfaces, so that selected angles of adjustment of the handle out of the plane of the tool may be obtained.

I claim:

1. A hacksaw comprising:
    a frame having a cross-member and two struts extending substantially normal to said cross-member;
    a saw blade;
    means for detachably connecting said saw blade between the extremities of said two struts;
    a handle carried by one of said struts and extending substantially normal thereto;
    means for rotating said handle about said strut to selected positions which are parallel to said strut;
    means for locking said handle in said selected positions about said strut;
    a locking button extending through said cross-member and cooperating with said locking means whereby said locking means may be disengaged so as to allow rotation to said handle to one of said selected positions;
    a sleeve member at the extremity of each said strut, each sleeve member including a hole therethrough defined by an inner peripheral shape having at least three flat sides, said hole extending substantially axial with said blade;
    two blade holding members, each having a shape corresponding to, and dimensioned so as to fit into said hole of one of said sleeve members;
    each blade holding member having a flat extending inwardly and engaging an extremity of said blade, and
    means for pulling one of said blade holding members through the corresponding hole for holding said blade holding members fast whereby said blade is rigidly fixed between the extremities of said two struts;
    wherein said locking means comprises:
        said cross-member having a hole in one end thereof axial with one of said struts, the periphery of said hole defined by at least three flat sides;
        a shaft extending through one end of said cross-member, said shaft having one end thereof defined by at least three flat sides and dimensioned and corresponding with said hole in said cross-member so as to be slidably engagable therewith;
        a rotatable block attached to said handle forming part of said strut between the extremities thereof, said block having a hole therein defined by at least three peripheral flat sides and dimensioned so as to receive said one end of said shaft; and wherein
    said locking button is coupled to the other end of said shaft whereby rotation of said handle is effected by lifting said locking button and causing said block to rotate about the axis of said strut, and locking is effected by depressing said locking button to cause said one end of said shaft to engage said hole in said block.

2. The hacksaw recited in claim 1 further comprising;
    said shaft intermediate said locking button in said one end having a reduced diameter with respect to said one end; and
    a spring about said reduced diameter portion in said hole of said cross-member for biasing said one end of said shaft towards said block.

3. The hacksaw recited in claim 2 further comprising:
    said strut further including a hole therein below said block; and
    a dowel extending from said block into said hole to effect rotation thereof.

4. The hacksaw recited in claim 1 further comprising:
    a second handle carried by the second of said two struts;
    second means for rotating said second handle about said second strut;
    second means for locking said second handle in selected positions about said second strut; and
    a second locking button extending through said cross-member and cooperating with said second locking means whereby said second locking means may be removed so as to allow rotation of said second handle parallel with said second strut to one of said selected positions.

5. The hacksaw recited in claim 1, further comprising third and fourth supporting struts, each positioned adjacent to and spaced from one of said two struts and coupled to said blade connecting means.

* * * * *